United States Patent
Arai et al.

(10) Patent No.: US 10,930,436 B2
(45) Date of Patent: Feb. 23, 2021

(54) MULTILAYER CERAMIC CAPACITOR

(71) Applicant: TAIYO YUDEN CO., LTD., Tokyo (JP)

(72) Inventors: Norihiro Arai, Takasaki (JP); Takeshi Nosaki, Takasaki (JP); Masumi Ishii, Takasaki (JP); Jyouji Ariga, Takasaki (JP); Hiroyuki Moteki, Takasaki (JP); Manabu Ozawa, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 63 days.

(21) Appl. No.: 16/178,292

(22) Filed: Nov. 1, 2018

(65) Prior Publication Data
US 2019/0139704 A1    May 9, 2019

(30) Foreign Application Priority Data
Nov. 7, 2017 (JP) .............................. JP2017-214392

(51) Int. Cl.
*H01G 4/232* (2006.01)
*H01G 4/008* (2006.01)
*H01G 4/12* (2006.01)
*H01G 4/30* (2006.01)

(52) U.S. Cl.
CPC ......... *H01G 4/2325* (2013.01); *H01G 4/0085* (2013.01); *H01G 4/1236* (2013.01); *H01G 4/30* (2013.01)

(58) Field of Classification Search
CPC ...... H01G 4/228; H01G 4/232; H01G 4/2325; H01G 4/30
See application file for complete search history.

(56) References Cited

U.S. PATENT DOCUMENTS

| | | | |
|---|---|---|---|
| 5,877,934 A * | 3/1999 | Sano | H01G 4/1227 361/312 |
| 2002/0039273 A1 | 4/2002 | Nakamura | |
| 2013/0250480 A1* | 9/2013 | Ahn | H01G 4/129 361/321.2 |

(Continued)

FOREIGN PATENT DOCUMENTS

| | | |
|---|---|---|
| JP | 2000348964 A | 12/2000 |
| WO | 2014175013 A1 | 10/2014 |

*Primary Examiner* — Eric W Thomas
(74) *Attorney, Agent, or Firm* — Law Office of Katsuhiro Arai

(57) ABSTRACT

A multilayer ceramic capacitor includes: a ceramic multilayer structure designated to have ceramic dielectric layers and internal electrode layers alternately stacked, the internal electrode layers being mainly composed of a transition metal other than an iron group, end edges of the internal electrode layers being alternately exposed to a first end face and a second end face; and a pair of external electrodes provided on the first end face and the second end face, wherein: the external electrodes have a base conductive layer and a first plated layer; the base conductive layer directly contacts the ceramic multilayer structure; a main component of the base conductive layer is a noble metal or a transition metal other than an iron group; and a total concentration of Si and B in a second-phase not contacting the ceramic multilayer structure is 0.3 wt % or less, in the base conductive layer.

11 Claims, 3 Drawing Sheets

(56) References Cited

U.S. PATENT DOCUMENTS

| | | | |
|---|---|---|---|
| 2014/0146437 A1* | 5/2014 | Lee | H01G 4/2325 |
| | | | 361/301.4 |
| 2016/0039711 A1 | 2/2016 | Miyazaki | |
| 2016/0071647 A1* | 3/2016 | Nishisaka | H01G 4/0085 |
| | | | 361/301.4 |
| 2017/0169952 A1* | 6/2017 | Kato | H01G 4/232 |
| 2018/0315549 A1* | 11/2018 | Ueda | H01G 4/012 |

* cited by examiner

MULTILAYER CERAMIC CAPACITOR

CROSS-REFERENCE TO RELATED APPLICATION

This application is based upon and claims the benefit of priority of the prior Japanese Patent Application No. 2017-214392, filed on Nov. 7, 2017, the entire contents of which are incorporated herein by reference.

FIELD

A certain aspect of the present invention relates to a multilayer ceramic capacitor.

BACKGROUND

As the number of functions of recent electronic devices increases and an operating frequency of the recent electronic devices get higher, refinement or improvement of each characteristic such as high capacity, downsizing, or reduction of ESR (Equivalent Series Resistance) of multilayer ceramic capacitors is required. As an external electrode of the multilayer ceramic capacitor, there is a first external electrode that is baked and bonded to a fired ceramic multilayer structure of a multilayer ceramic capacitor or a second external electrode that is fired together with a ceramic multilayer structure of a multilayer ceramic capacitor.

For the purpose of decreasing a sintering temperature of the first external electrode or securing adhesive force of a terminal electrode, there is known a technology in which a glass component including Si or B is added to a conductive paste for forming an external electrode (for example, see International Publication No. 2014/175013). With respect to the second external electrode, for the purpose of delaying sintering, there is known a technology in which a dielectric powder that is the same as a dielectric material of a ceramic body or is similar to the dielectric material is added (for example, see Japanese Patent Application Publication No. 2000-348964). It is known that these dielectric components include Si or B.

SUMMARY OF THE INVENTION

However, the glass component including Si or B in the external electrode tends to be precipitated in an interface between internal electrode layers and the external electrode, in an interface between a ceramic body and the external electrode, in a surface of the external electrode and so on. The precipitated glass component acts as a resistance component and may be a factor of degrading (increasing) ESR in a high frequency range. The glass component may degrade adherence intensity of a plated layer. Plating solution may intrude in a void that is generated because the glass component is dissolved during a plating process of the plated layer, and burst of solder and reduction of the reliability may occur.

The present invention has a purpose of providing a multilayer ceramic capacitor that is capable of suppressing bad influence on an external electrode.

According to an aspect of the present invention, there is provided a multilayer ceramic capacitor including: a ceramic multilayer structure designated to have ceramic dielectric layers and internal electrode layers alternately stacked, the internal electrode layers being mainly composed of a transition metal other than an iron group, end edges of the internal electrode layers being alternately exposed to a first end face and a second end face of the ceramic multilayer structure; and at least a pair of external electrodes that are provided on the first end face and the second end face of the ceramic multilayer structure, wherein: the external electrodes have a base conductive layer and a first plated layer covering the base conductive layer; the base conductive layer directly contacts the ceramic multilayer structure; a main component of the base conductive layer is a noble metal or a transition metal other than an iron group; and a total concentration of Si and B in a second-phase not contacting the ceramic multilayer structure is 0.3 wt % or less, in the base conductive layer.

DETAILED DESCRIPTION

A description will be given of an embodiment with reference to the accompanying drawings.

Embodiment

Figure 1:
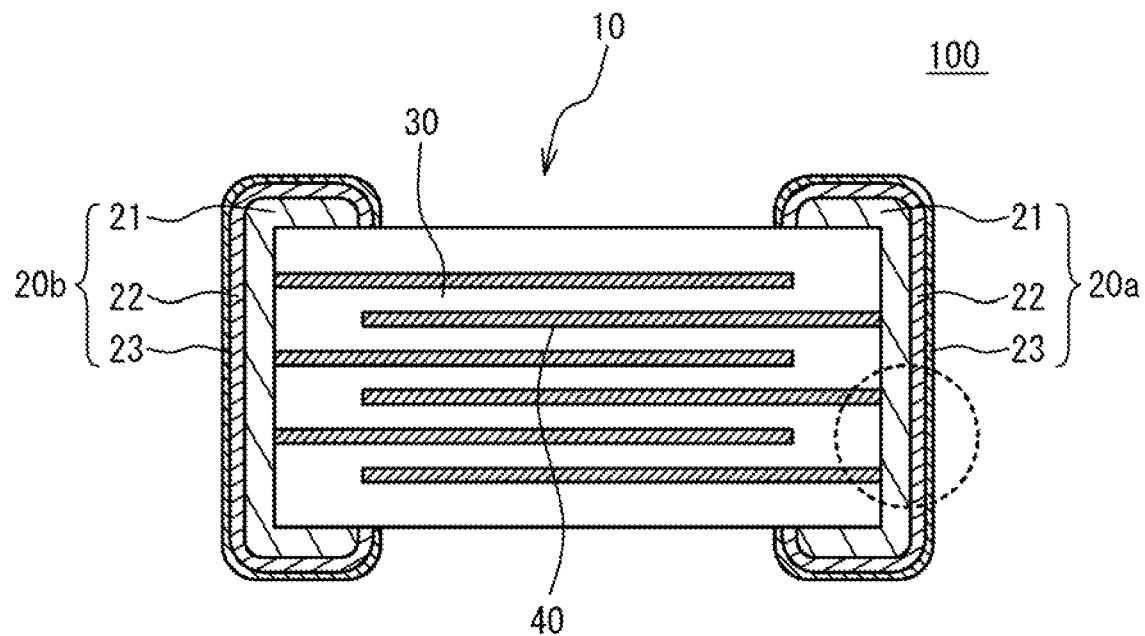
FIG. 1 illustrate a multilayer ceramic capacitor in accordance with an embodiment.

FIG. 1 illustrates a multilayer ceramic capacitor 100 in accordance with an embodiment. The multilayer ceramic capacitor 100 illustrated in FIG. 1 is one example. Therefore, the multilayer ceramic capacitor 100 may be applied to shapes other than that of FIG. 1. The multilayer ceramic capacitor 100 may be used for an array.

As illustrated in FIG. 1, the multilayer ceramic capacitor 100 includes a ceramic multilayer structure 10 having a rectangular parallelepiped shape, and at least a pair of external electrodes 20a and 20b. The ceramic multilayer structure 10 has a structure designed to have ceramic dielectric layers 30 and internal electrode layers 40 alternately stacked. In FIG. 1, hatching of the ceramic dielectric layers 30 is omitted. End edges of the internal electrode layers 40 are alternately exposed to a first end face of the ceramic multilayer structure 10 and a second end face of the ceramic multilayer structure 10 that is different from the first end face. In the embodiment, the first face faces with the second face. The external electrode 20a is provided on the first end face. The external electrode 20b is provided on the second end face.

The ceramic dielectric layers 30 are mainly composed of a ceramic material having a perovskite structure expressed by a general expression $ABO_3$. The perovskite structure includes $ABO_{3-\alpha}$ having an off-stoichiometric composition. For example, the ceramic material may be $CaZrO_3$ (calcium zirconate), $BaTiO_3$ (barium titanate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure and so on.

The internal electrode layer 40 is a conductive thin film that is mainly composed of a transition metal component such as Cu other than iron group (Fe (iron), Co (cobalt) and Ni (nickel)).

The external electrodes 20a and 20b have a base conductive layer 21, a first plated layer 22 and a second plated layer 23. The base conductive layer 21 directly contacts the ceramic multilayer structure 10. The first plated layer 22 directly contacts the base conductive layer 21 and covers the base conductive layer 21. The second plated layer 23 directly contacts the first plated layer 22 and covers the first plated layer 22. The base conductive layer 21 includes ceramic and is mainly composed of a transition metal such as Cu other than an iron group, or a noble metal such as Ag (silver), Au (gold), Pt (platinum), or Pd (palladium). Preferable high frequency characteristics can be achieved, because the base conductive layer 21 is mainly composed of the transition metal other than the iron group, or the noble metal. For example, the base conductive layer 21 has a thickness of approximately 4 μm to 10 μm.

It is possible to form the base conductive layer 21 by baking the base conductive layer 21 to the fired ceramic multilayer structure 10 (hereinafter referred to as baking after firing) or firing the ceramic multilayer structure together with the base conductive layer 21 (hereinafter referred to as simultaneous firing).

In the case of the baking after firing, a glass component may be added to the base conductive layer 21 in order to control a sintering temperature of the base conductive layer 21, adhesive force of the base conductive layer 21 and so on. In this case, a second-phase may be precipitated in the base conductive layer 21. The second-phase is a phase having a different composition from that of a crystal of a main component metal of the base conductive layer 21. In the case of the simultaneous firing, additive or a co-material that is the same as a component of the ceramic dielectric layers 30 or is similar to the component of the ceramic dielectric layer 30 may be added to the base conductive layer 21 in order to control the sintering property of the base conductive layer 21. In this case, a second-phase is precipitated in the base conductive layer 21.

In the case of baking after firing, Si (silicon) or B (boron) may be added to the base conductive layer 21 as the glass component. In the case of the simultaneous firing, the co-material or the additive may include Si or B. Si or B is precipitated as the glass component. Therefore, in the base conductive layer 21, the glass component is precipitated as the glass component. The glass component is not limited. The glass component may be an amorphous including one or more of network formation oxides and one or more of network modifier oxides. For example, the network formation oxide is such as $B_2O_3$, $SiO_2$ or the like. The network modifier oxide is such as $Al_2O_3$, ZnO, CuO, $Li_2O$, $Na_2O$, $K_2O$, MgO, CaO, BaO, $ZrO_2$, $TiO_2$ or the like.

Figure 2A:
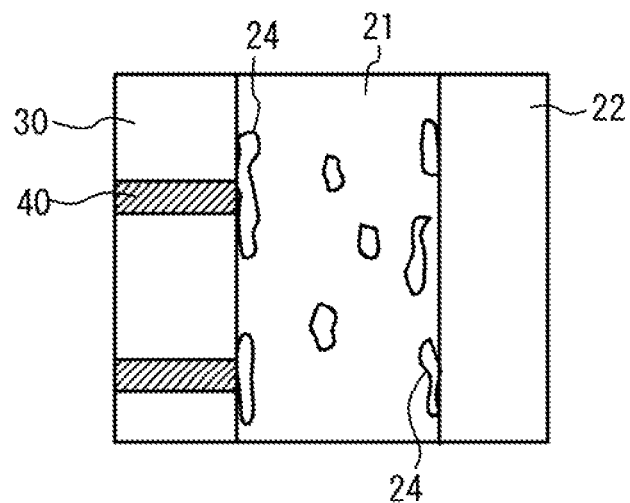
FIG. 2A to FIG. 2C illustrate an enlarged view of a region surrounded by a dotted line of FIG. 1.

When a large amount of the glass component is added, the second-phase 24 including a large amount of the glass component tends to be precipitated in an interface between the internal electrode layers 40 and the base conductive layer 21, in an interface between the ceramic dielectric layers 30 and the base conductive layer 21, in a surface of the base conductive layer 21 and so on. FIG. 2A illustrates an enlarged view of a region surrounded by a dotted line of FIG. 1. In this case, the glass component may act as a resistance component and may be a factor of degrading (increasing) ESR in a high frequency range. The glass component may degrade adherence force of the first plated layer 22. The plating solution may intrude in a void that is generated because the glass component is dissolved during the plating process of the first plated layer 22, and burst of solder and reduction of the reliability may occur.

Figure 2B:
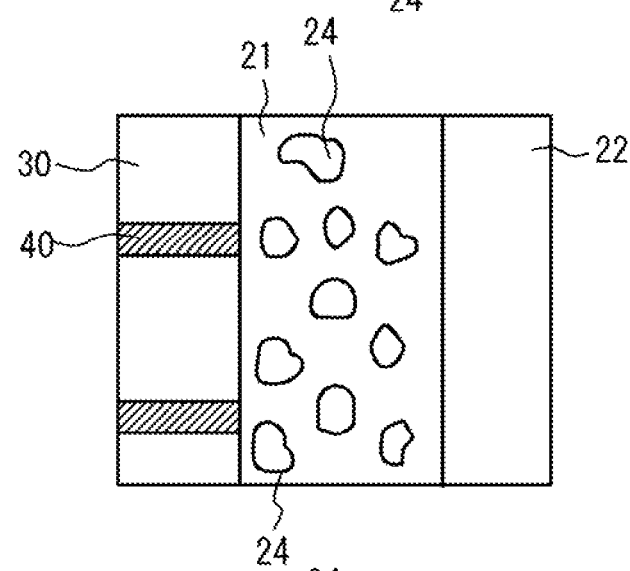
Figure 2C:
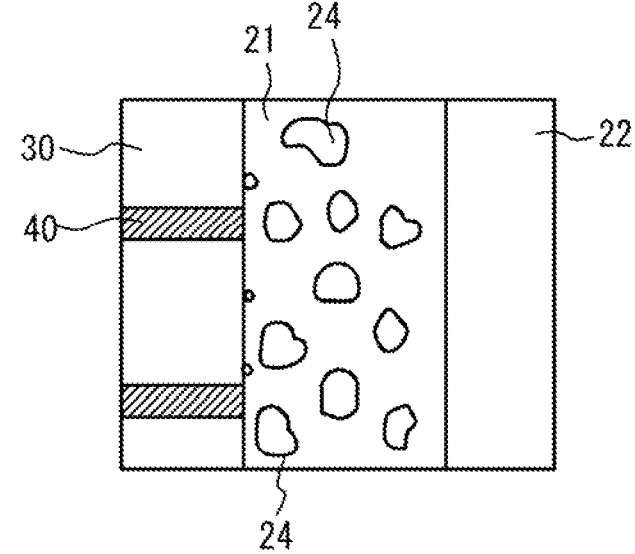

On the other hand, when the amount of the glass component is small, the precipitation of the second-phase 24 is suppressed in the interface between the internal electrode layers 40 and the base conductive layer 21, in the interface between the ceramic dielectric layers 30 and the base conductive layer 21, in the surface of the base conductive layer 21 and so on. Accordingly, the amount of the glass component is reduced in the interface between the internal electrode layers 40 and the base conductive layer 21, in the interface between the ceramic dielectric layers 30 and the base conductive layer 21, in the surface of the base conductive layer 21 and so on. And so, in the embodiment, the amount of the glass component added to the base conductive layer 21 is reduced. Alternatively, the glass component is not added to the base conductive layer 21. In concrete, a total of concentrations of Si and B in each second-phase 24 not contacting the ceramic dielectric layers 30 is 0.3 wt % or less. In this case, as illustrated in FIG. 2B, the precipitation of the second-phase 24 is suppressed in the interface between the internal electrode layer 40 and the base conductive layer 21, in the interface between the ceramic dielectric layers 30 and the base conductive layer 21, in the surface of the base conductive layer 21 and so on. FIG. 2B illustrates an enlarged view of a region surrounded by a dotted line of FIG. 1. Thus, bad influence of the glass component is suppressed. It is possible to reduce the ESR in the high frequency range. The adherence force of the first plated layer 22 is preferable. And it is possible to suppress the solder burst and the degradation of the reliability of the first plated layer 22. In order to suppress the influence of the glass component, it is preferable that the total of concentrations of Si and B in each second-phase 24 not contacting the ceramic dielectric layers 30 is 0.2 wt % or less. The glass component may diffuse from the ceramic dielectric layers 30. In this case, as illustrated in FIG. 2C, the second-phase 24 contacting the ceramic dielectric layers 30 may be precipitated. In this case, the total of concentrations of Si and B in the second-phase 24 contacting the ceramic dielectric layers 30 may exceed 0.3 wt %.

An average of the total concentration of Si and B in each second-phase 24 in a large area of the base conductive layer 21 is reduced, when the amount of the glass component added to the base conductive layer 21 is reduced or the glass component is not added to the base conductive layer 21. And so, the average of the total concentration of Si and B of all second-phases 24 that are found in a SEM image of a scale factor of 1000 may be 0.3 wt % or less.

For example, it is preferable that a main component of the second-phase 24 is the main component ceramic of the ceramic dielectric layers 30. For example, it is preferable that the main component of the second-phase 24 is $CaZrO_3$ when the main component ceramic of the ceramic dielectric layers 30 is $CaZrO_3$.

When an affinity with the solder used in the mounting of the multilayer ceramic capacitor 100 is considered, it is preferable that a Ni-plating is used for the forming of the first plated layer 22. It is preferable that a main component of the second plated layer 23 is a transition metal different from a transition metal that is a main component of the first plated layer 22. For example, when the affinity with the solder used in the mounting of the multilayer ceramic capacitor 100, it is preferable that a main component of the second plated layer 23 is a transition metal such as Sn (tin) or the like. In a case where electrical characteristic in the high frequency range is considered, the resistance component increases because of skin effect in the high frequency range when an iron group transition metal having a high relative permeability such as Ni exists on a signal line. In this case, a dielectric loss may increase. And so, it is preferable that a transition metal (Cu, Sn or the like) other than the iron group element is used as the main component of the first plated layer 22 and the main component of the second plated layer 23.

Figure 3:
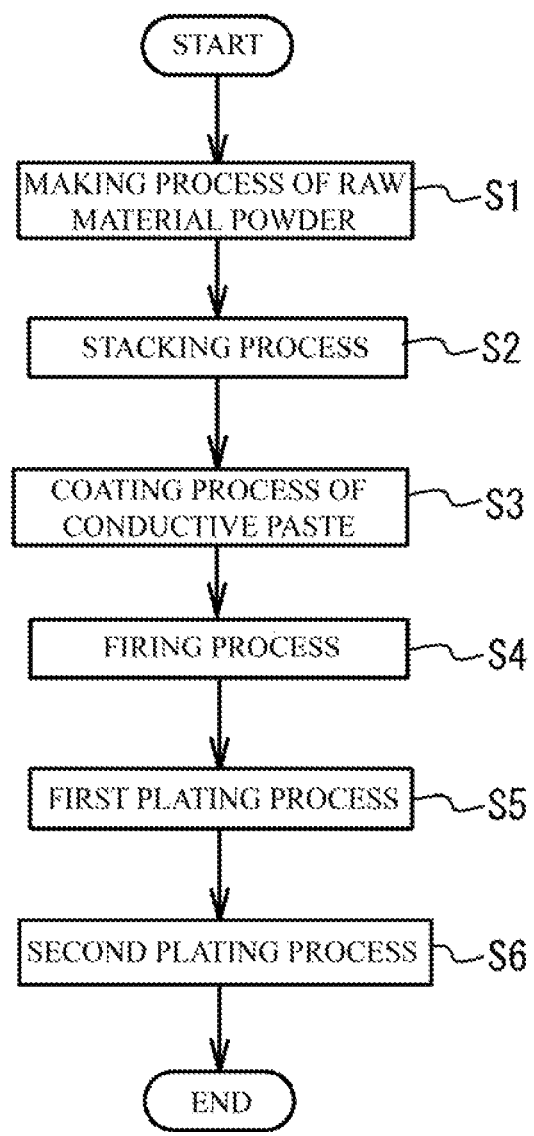
FIG. 3 is a flowchart illustrating a method of manufacturing a multilayer ceramic capacitor.

A description will next be given of a manufacturing method of the multilayer ceramic capacitor 100. FIG. 3 is a flowchart illustrating a method of manufacturing the multilayer ceramic capacitor 100.

(Raw Powder Preparation Process) First, specified additive compounds may be added to ceramic material powder that is the main component of the ceramic dielectric layer 30 according to the purpose. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co, Ni, Li (lithium), B, Na (sodium), K (potassium) and Si, or glass. Compound including additive compound is mixed with the ceramic material powders. The resulting ceramic powders are calcined. Then, the ceramic powders are wet-blended with the additive compound. After that, the ceramic powders with the additive compound are dried and crushed. And, desirable ceramic powder is prepared.

Next, a binder such as polyvinyl butyral (PVB) resin, an organic solvent such as ethanol or toluene, and a plasticizer are added to the resulting ceramic material powder and wet-blended. With use of the resulting slurry, a strip-shaped dielectric green sheet substance with a thickness of 5 to 20 μm is coated on a base material by, for example, a die coater method or a doctor blade method, and then dried.

(Stacking Process) Then, a conductive paste for forming the internal electrode is printed on the surface of the dielectric green sheet by screen printing or gravure printing to arrange patterns of the internal electrode layers 40. The conductive paste for forming the internal electrode includes powder of the main component metal of the internal electrode layer 40, a binder, a solvent and an auxiliary agent as needed. It is preferable that the binder and the solvent are different from those of the ceramic paste. The ceramic material that is the main component of the ceramic dielectric layer 30 may be dispersed into the conductive paste for forming the internal electrode, as a co-material.

Then, the dielectric green sheet on which the internal electrode layer pattern is printed is stamped into a predetermined size, and a predetermined number (for example, 4 to 50) of stamped dielectric green sheets are stacked while the base material is peeled so that the internal electrode layers 40 and the ceramic dielectric layers 30 are alternated with each other and the end edges of the internal electrode layers 40 are alternately exposed to both end faces in the length direction of the dielectric layer so as to be alternately led out to a pair of external electrodes of different polarizations. Thereby, a compact having a rectangular parallelepiped shape is obtained. Dielectric green sheet, which are to be the cover layers, are stacked on the compact and under the compact.

(Coating Process) Next, a conductive paste for forming the base conductive layer is coated on the two edge faces to which the internal electrode patterns of the resulting multilayer structure are exposed. Thus, a compact is obtained. The conductive paste for forming the base conductive layer includes powder of the main component metal of the base conductive layer 21, a binder, a solvent, and an auxiliary agent as needed. The binder and the solvent may be the same as those of the conductive paste for the internal electrode. And a ceramic material that is the main component of the ceramic dielectric layer 30 is dispersed in the conductive paste for forming the base conductive layer as a co-material. The conductive paste for forming the base conductive layer includes neither Si nor B. Alternatively, the conductive paste for forming the base conductive layer includes a slight amount of Si and B.

(Firing Process) Next, the resulting compact is fired for approximately two hours at a temperature of approximately 900 degrees C. to 1050 degrees C. in a reductive atmosphere of which $H_2$ volume % is approximately 1.5. In this case, it is possible to perform the firing of the ceramic dielectric layers 30 and the internal electrode layers 40 and the baking of the base conductive layer 21 at the same process. And, a semi-product of the multilayer ceramic capacitor 100 can be obtained.

(First Plating Process and Second Plating Process) Next, the first plated layer 22 is formed on the base conductive layer 21 of the semi-product by an electrolytic plating. Moreover, the second plated layer 23 is formed on the first plated layer 22 by an electrolytic plating.

In the manufacturing method of the embodiment, no glass component is added to the conductive paste for forming the base conductive layer, or a slight amount of the glass component is added to the conductive paste for forming the base conductive layer. Therefore, the amount of the glass component is reduced. Thus, the total concentration of Si and B in the second-phase 24 can be 0.3 wt % or less. In this case, as illustrated in FIG. 2B, the precipitation of the glass component is suppressed in the interface between the internal electrode layers 40 and the base conductive layer 21, in the interface between the ceramic dielectric layers 30 and the base conductive layer 21, in the surface of the base conductive layer 21 and so on. Thus, bad influence of the glass component is suppressed. It is possible to reduce the ESR in the high frequency range. The adherence force of the first plated layer 22 is preferable. And it is possible to suppress the solder burst and the degradation of the reliability of the first plated layer 22. In order to suppress the influence of the glass component, it is preferable that the total of concentration of Si and B in each second-phase 24 not contacting the base conductive layer 21 is 0.2 wt % or less.

EXAMPLES

The multilayer ceramic capacitors in accordance with the embodiment were made and the property was measured.

Examples 1 to 3

$CaZrO_3$ was used as a ceramic material that is a main component of the ceramic dielectric layers 30. A molar ratio of Ca with respect to Zr (Ca/Zr) was 1.05. As an additive material, BN (3.5 mol %), $SiO_2$ (3.5 mol %), $Li_2CO_3$ (1.75 mol %) and $MnCO_3$ (3.5 mol %) were added to the ceramic dielectric layers 30. Cu was used as the main component of the internal electrode layers 40. Cu was used as a main component of the base conductive layer 21 of the external electrodes 20a and 20b. 6 weight part of $CaZrO_3$ was used as the co-material. The conductive paste for forming a base conductive layer included neither Si nor B. The condition of the simultaneous firing was a reductive atmosphere including approximately 1.5 volume % of $H_2$ and a firing temperature of 980 degrees C. Ni was used as the first plated layer 22. The thickness of the first plated layer 22 was 5 μm. Sn was used as the second plated layer 23. The thickness of the second plated layer 23 was 2.5 μm. In the example 1, the size of the multilayer ceramic capacitor 100 was the length of 0.4 mm, the width of 0.2 mm and the height of 0.2 mm. In the example 2, the size of the multilayer ceramic capacitor 100 was the length of 1.0 mm, the width of 0.5 mm and the height of 0.5 mm. In the example 3, the size of the multilayer ceramic capacitor 100 was the length of 2.0 mm, the width of 1.25 mm and the height of 0.95 mm.

Comparative Example

In a comparative example, the conductive paste for forming the base conductive layer after firing of the multilayer structure was coated after firing of the multilayer structure and was baked in nitrogen atmosphere of 800 degrees C. $CaZrO_3$ was not added to the conductive paste for forming the base conductive layer. 6 weight part of the glass component was added to the conductive paste, as the additive. The glass component included $SiO_2$ and $B_2O_3$ as the network former oxide, and included $Na_2O$, $Al_2O_3$, $TiO_2$ and ZnO as the network modifier oxide. Other conditions were the same as those of the example 1.

(Analysis) Each component of the second-phase 24 not contacting the ceramic dielectric layers 30 was measured in the base conductive layer 21. Measured points were a metal phase of the base conductive layer 21 (a point of which a center is the metal portion of the base conductive layer 21), an interface between the metal phase and the second-phase (a point in which a center is the portion where the metal phase contacted the second-phase) and the second-phase (a point of which a center is the second-phase). Measurement conditions of the EPMA were shown in Table 1.

TABLE 1

| CONDUCTIVE TREATMENT | CARBON COATING |
|---|---|
| ANALYSIS DEVICE | EPMA(JXA-8230) MADE BY JAPAN ELECTRON OPTICS LABORATORY |
| ACCELERATION VOLTAGE | 20 kV |
| ILLUMINATION CURRENT | 50 nA |

Table 2 shows measured results of the metal phase. Table 3 shows measured results of the interface between the metal phase and the second-phase. Table 4 shows measured results of the second-phase. As shown in Table 2 and Table 3, the total concentration of Si and B was 0.3 wt % or less in the metal phase and the interface between the metal phase and the second-phase in any of the examples 1 to 3. On the other hand, in the comparative example, the total concentration of Si and B was 0.4 wt % or more in the metal phase and the interface between the metal phase and the second-phase. In addition, as illustrated in Table 4, in the second-phase, although the total concentration of Si and B was 0.3 wt % or less in the examples 1 to 3, the Si concentration and the B concentration were respectively 7.0 wt % and 15.0 wt % in the comparative example. This is because the glass component was added as the additive. In any position of the examples 1 to 3, B was not detected.

TABLE 2

| | wt % | | | |
|---|---|---|---|---|
| | EXAMPLE 1 | EXAMPLE 2 | EXAMPLE 3 | COMPARATIVE EXAMPLE |
| Cu | 93.7 | 98.4 | 99.0 | 98.7 |
| Ca | 1.0 | 0.1 | 0.2 | 0.1 |
| Zr | 3.3 | — | — | — |
| Si | 0.2 | — | — | — |

TABLE 2-continued

| | wt % | | | |
|---|---|---|---|---|
| | EXAMPLE 1 | EXAMPLE 2 | EXAMPLE 3 | COMPARATIVE EXAMPLE |
| B | — | — | — | 0.4 |
| O | 0.9 | 0.6 | 0.7 | 0.5 |
| Ni | 0.8 | 0.8 | — | 0.7 |

TABLE 3

| | wt % | | | |
|---|---|---|---|---|
| | EXAMPLE 1 | EXAMPLE 2 | EXAMPLE 3 | COMPARATIVE EXAMPLE |
| Cu | 68.1 | 94.2 | 74.7 | 98.2 |
| Ca | 7.3 | 0.5 | 4.0 | 0.1 |
| Zr | 20.5 | 3.2 | 14.9 | — |
| Si | 0.2 | — | 0.2 | 0.2 |
| B | — | — | — | 0.4 |
| Mn | 0.3 | — | 0.2 | — |
| O | 3.0 | 1.3 | 5.8 | 0.9 |
| Ni | 0.6 | 0.8 | 0.2 | 0.6 |

TABLE 4

| | wt % | | | |
|---|---|---|---|---|
| | EXAMPLE 1 | EXAMPLE 2 | EXAMPLE 3 | COMPARATIVE EXAMPLE |
| Cu | 45.6 | 33.4 | 21.7 | 69.5 |
| Ca | 10.7 | 13.7 | 17.1 | 0.4 |
| Zr | 30.3 | 37.3 | 43.2 | 1.5 |
| Si | 0.1 | 0.1 | 0.2 | 7.0 |
| B | — | — | — | 15.0 |
| Mn | 0.3 | 0.4 | 0.5 | 0.1 |
| Hf | 0.9 | 1.3 | 1.0 | — |
| Na | — | — | — | 4.2 |
| Al | — | — | — | 1.2 |
| Ti | — | — | — | 0.4 |
| Zn | — | — | — | 0.4 |
| O | 11.5 | 13.0 | 16.2 | 14.6 |
| Ni | 0.5 | 0.6 | — | 0.5 |

Next, connection conditions between the internal electrode layers 40 and the base conductive layers 21 were observed. In the comparative example, the second-phase 24 was found in the interface between the internal electrode layers 40 and the base conductive layers 21. A connection condition of a part of the connected portion was bad. On the other hand, in the examples 1 to 3, the second-phase 24 was hardly found in the interface between the internal electrode layers 40 and the base conductive layers 21. The connection condition between the internal electrode layers 40 and the base conductive layers 21 was good. Next, a Q value of 1 GHz was measured. The Q values of the examples 1 to 3 were good. However, in the comparative example, the Q value was reduced by approximately 20%. It is thought that this was because the connection condition between the internal electrode layers 40 and the base conductive layers 21 had influence on the frequency characteristic.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
a ceramic multilayer structure designated to have ceramic dielectric layers and internal electrode layers alternately stacked, the internal electrode layers being mainly composed of a transition metal other than an iron group, end edges of the internal electrode layers being alternately exposed to a first end face and a second end face of the ceramic multilayer structure; and
at least a pair of external electrodes that are provided on the first end face and the second end face of the ceramic multilayer structure,
wherein:
the external electrodes have a base conductive layer and a first plated layer covering the base conductive layer;
the base conductive layer directly contacts the ceramic multilayer structure, wherein the base conductive layer includes a first portion and a second portion constituted by a second-phase, wherein the first portion is not in contact with the ceramic multilayer structure, and the second portion is in direct contact with the ceramic multilayer structure;
a main component of the base conductive layer is a noble metal or a transition metal other than an iron group; and
a total concentration of Si and B in the first portion of the second-phase not contacting the ceramic multilayer structure is 0.3 wt % or less, in the base conductive layer; and
the first portion of the second-phase not contacting the ceramic multilayer structure includes at least one of Si and B.

2. The multilayer ceramic capacitor as claimed in claim 1, wherein a main component of the ceramic dielectric layers is $CaZrO_3$.

3. The multilayer ceramic capacitor as claimed in claim 1, further comprising:
a second plated layer that covers the first plated layer, wherein a main component of the second plated layer is a transition metal different from the transition metal that is the main component of the first plated layer.

4. The multilayer ceramic capacitor as claimed in claim 3, wherein:
a main component of the base conductive layer is Cu;
a main component of the first plated layer is Cu; and
a main component of the second plated layer is Sn.

5. The multilayer ceramic capacitor as claimed in claim 1, wherein the base conductive layer has a thickness of approximately 4 μm to 10 μm.

6. The multilayer ceramic capacitor as claimed in claim 1, wherein a total concentration of Si and B in the second portion of the second-phase contacting the ceramic multilayer structure is more than 0.3 wt %, in the base conductive layer.

7. A multilayer ceramic capacitor comprising:
a ceramic multilayer structure designated to have ceramic dielectric layers and internal electrode layers alternately stacked, the internal electrode layers being mainly composed of a transition metal other than an iron group, end edges of the internal electrode layers being alternately exposed to a first end face and a second end face of the ceramic multilayer structure; and
at least a pair of external electrodes that are provided on the first end face and the second end face of the ceramic multilayer structure,
wherein:
the external electrodes have a base conductive layer and a first plated layer covering the base conductive layer;
the base conductive layer directly contacts the ceramic multilayer structure, wherein the base conductive layer includes a first portion and a second portion constituted by a second-phase, wherein the first portion is not in contact with the ceramic multilayer structure, and the second portion is in direct contact with the ceramic multilayer structure;
a main component of the base conductive layer is a noble metal or a transition metal other than an iron group;
a total concentration of Si and B in the first portion of the second-phase not contacting the ceramic multilayer structure is 0.3 wt % or less, in the base conductive layer; and the second-phase of the base conductive layer includes ceramic that is the main component of the ceramic dielectric layers.

8. The multilayer ceramic capacitor as claimed in claim 7, wherein a main component the ceramic included in the second-phase is $CaZrO_3$.

9. A multilayer ceramic capacitor comprising:
a ceramic multilayer structure designated to have ceramic dielectric layers and internal electrode layers alternately stacked, the internal electrode layers being mainly composed of a transition metal other than an iron group, end edges of the internal electrode layers being alternately exposed to a first end face and a second end face of the ceramic multilayer structure; and
at least a pair of external electrodes that are provided on the first end face and the second end face of the ceramic multilayer structure,
wherein:
the external electrodes have a base conductive layer and a first plated layer covering the base conductive layer;
the base conductive layer directly contacts the ceramic multilayer structure, wherein the base conductive layer includes a first portion and a second portion constituted by a second-phase, wherein the first portion is not in contact with the ceramic multilayer structure, and the second portion is in direct contact with the ceramic multilayer structure;
a main component of the base conductive layer is a noble metal or a transition metal other than an iron group;
a total concentration of Si and B in the first portion of the second-phase not contacting the ceramic multilayer structure is 0.3 wt % or less, in the base conductive layer;
the base conductive layer has a thickness of approximately 4 μm to 10 μm; and
the second-phase of the base conductive layer includes ceramic that is the main component of the ceramic dielectric layers.

10. The multilayer ceramic capacitor as claimed in claim 9, wherein a main component the ceramic included in the second-phase is $CaZrO_3$.

11. A multilayer ceramic capacitor comprising:
a ceramic multilayer structure designated to have ceramic dielectric layers and internal electrode layers alternately stacked, the internal electrode layers being mainly composed of a transition metal other than an iron group, end edges of the internal electrode layers being alternately exposed to a first end face and a second end face of the ceramic multilayer structure; and
at least a pair of external electrodes that are provided on the first end face and the second end face of the ceramic multilayer structure,
wherein:
the external electrodes have a base conductive layer and a first plated layer covering the base conductive layer;

the base conductive layer directly contacts the ceramic multilayer structure, wherein the base conductive layer includes a first portion and a second portion constituted by a second-phase, wherein the first portion is not in contact with the ceramic multilayer structure, and the second portion is in direct contact with the ceramic multilayer structure;

a main component of the base conductive layer is a noble metal or a transition metal other than an iron group;

a total concentration of Si and B in the first portion of the second-phase not contacting the ceramic multilayer structure is 0.3 wt % or less, in the base conductive layer;

the base conductive layer has a thickness of approximately 4 μm to 10 μm; and a total concentration of Si and B in the second portion of the second-phase contacting the ceramic multilayer structure is more than 0.3 wt %, in the base conductive layer.

\* \* \* \* \*